Patented Dec. 1, 1931

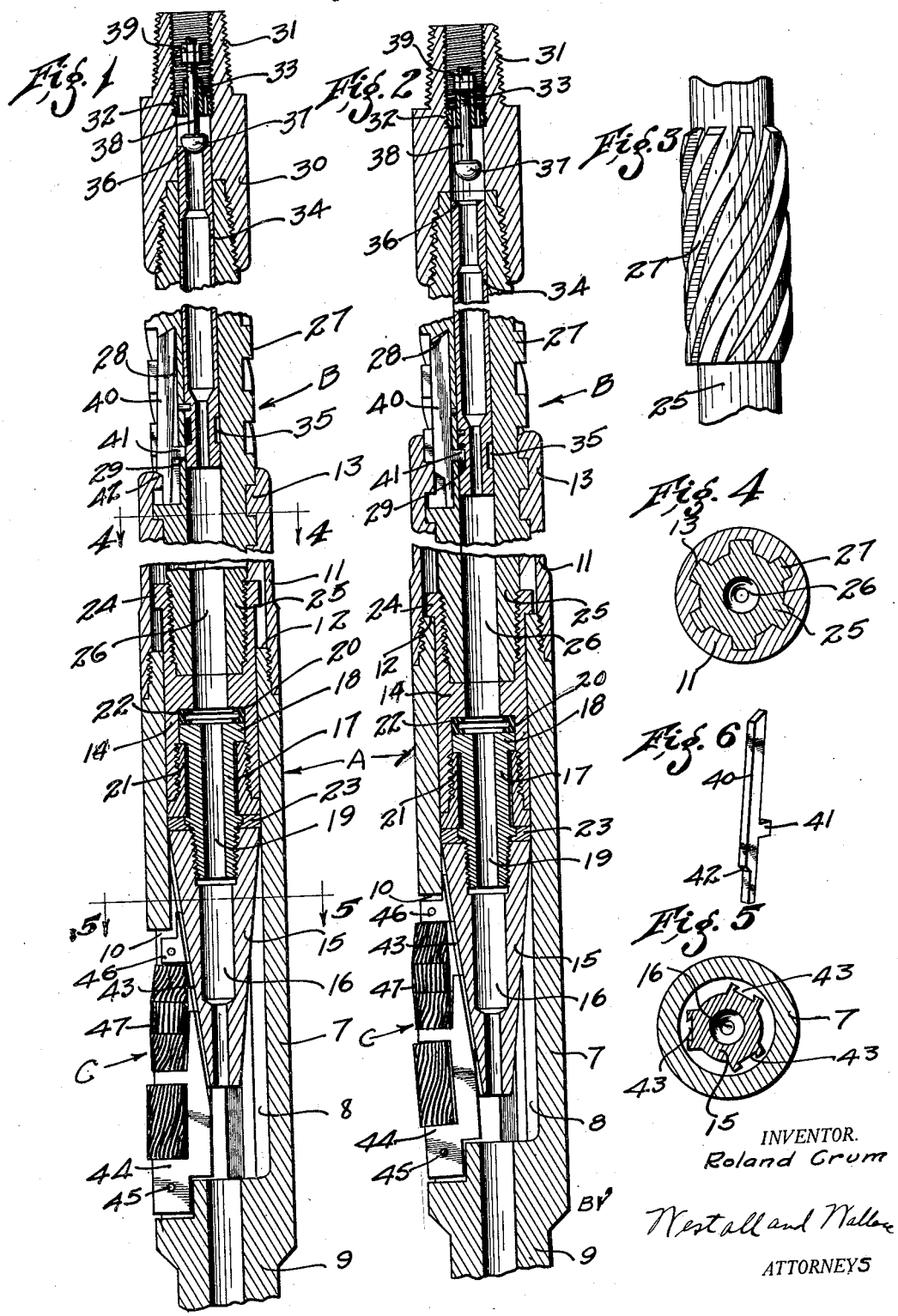

1,834,337

UNITED STATES PATENT OFFICE

ROLAND CRUM, OF WHITTIER, CALIFORNIA, ASSIGNOR, BY MESNE ASSIGNMENTS, TO JOHN GRANT, OF LOS ANGELES, CALIFORNIA

EXPANSIBLE UNDERREAMER

Application filed January 3, 1928, Serial No. 244,127. Renewed April 13, 1931.

This invention relates to expansible tools for operation in bore holes, and pertains particularly to a tool having work performing members expansible into work performing position and retractable therein into a position of collapsion.

A certain type of such tools include an expander head movable axially within a body and engaging the work performing members for actuating them in their function of collapsion and expansion. The expander includes a stem for rotating the tool to perform its work. The torque thrust in rotation of the tool has been heretofore taken by the connection between the work performing members and the expander head, which has a tendency to jam the members and interfere with their collapsion and expansion. This invention has to do with such a type of tool and an object thereof is to provide means for relieving the torque thrust upon the work performing members. Another object of this invention is to provide such thrust means which will function to move the expander into and out of the body. Other objects are to provide such a tool with a catch operable at will to restrain said expander against movement into the body and to release the same when desired.

A specific embodiment of the present invention is an expansible underreamer having a slotted body through which cutters are projectable. An expander having a wedge head is connected to the cutters by mortises and tenons so that by movement of the wedge head, the cutters will be projected and retracted. The expander head is connected to a stem for rotating the tool to perform its work, and means is provided to spline the stem to the body so as to take the torque thrust and at the same time to perform the function of causing the expander to be moved longitudinally of the body.

An embodiment of the invention is illustrated in the accompanying drawings in which:

Fig. 1 is a longitudinal section through an underreamer, parts being broken out to contract the view and the elements being shown in collapsed position; Fig. 2 is a view similar to Fig. 1 showing a fragment of the tool with the parts in expanded position; Fig. 3 is an elevation of a fragment of the shank of stem; Figs. 4 and 5 are sections as seen on the lines correspondingly numbered in Fig. 1; and Fig. 6 is a perspective view of the catch.

Referring more particularly to the drawings, the body of the tool is indicated by A and the expander by B. C marks the work performing members.

The body A comprises a cutter end 7 having a bore 8 reduced at the lower end where it passes through a stem 9 for connection to a tool such as a fish tail bit. However, the latter tool forms no part of the present invention and the means of connection is well known in the art and therefore is not shown. The body has longitudinal slots 10 for the cutters. At the upper end it is externally reduced in diameter and threaded to receive a sleeve 11. The sleeve has internal threads at its lower end for engagement with the cutter end of the body, there being a shoulder 12 formed at the top of the cutter end and within the bore of the sleeve. Spiral teeth 13 providing slots or ways are formed in the sleeve, and the upper end of the sleeve is rounded. The expander has a wedge head 15 provided with a bore 16, extending therethrough and enlarged and tapered at the upper end to provide a box to receive the threaded end of a pin 17. The pin has a flange head 18 and a bore 19 which serves as a continuation of the bore 16. An intermediate member 14 is provided with a socket 20 receiving the flange head 18, the latter being held in position by a bushing 21. A packing ring 22 preferably of rubber is mounted between the head and the end of the socket. At the lower end a wear ring 23 is disposed between the bushing and the wedge head. The construction is such that the wedge head is swivelled to the intermediate member 14. The upper end of the intermediate member has a shoulder 24 for engagement with the shoulder 12 on the cutter end of the body. The bore is enlarged and internally threaded to receive the pin end of a hollow shank 25. The shank has a bore 26 extending therethrough and is provided at the upper end with a thread for connection to a sub 30. On the periphery of the shank are spiral keys 27 to engage the key-ways in the sleeve. Extending longitudinally of the shank and on its outer surface is a cavity 28 to receive a catch pin. An opening 29 joins the cavity with the bore of the shank and provides for accommodation of a lug or finger on the catch key. Mounted over the upper end of the shank is the sub 30 having a bore forming a continuation of the bore in the shank and a tapered threaded end 31 for connection to the box on a drill string for rotating the tools. The bore of the sub is internally threaded to receive a guide 32 which is of spider form and has a hub 33.

Slidably mounted within the bore of the shank is a hollow plunger 34 having at its lower end a peripheral recess 35. The upper end is constructed to provide a valve seat 36 for a valve plug 37. The plug is secured to a stem 38 which extends through the hub in the guide, and secured to the top of the stem are abutment nuts 39. The valve is arranged to follow the plunger in its reciprocation downwardly, the abutment nuts limiting the movement of the valve so that in the final position of the plunger, the valve will be unseated to open the valve port and permit circulation through the plunger. The catch key 40 has a finger 41 which extends into the opening 29. An inclined shoulder 42 is arranged to engage the upper surface of the sleeve 11 and to ride thereover when released from its outer position.

The tool is collapsed by withdrawing the expander, the plunger being in its upper position as shown in Fig. 1. The finger will rest against the side of the plunger so as to hold the catch key in its outer or restraining position. The bore through the plunger is closed. The tool is lowered in the hole to the position at which it is desired to expand it. Circulation is inaugurated which will cause the plunger 34 to be moved downwardly followed by the valve plug 37 until the recess 35 registers with the finger 41, thereby releasing the catch key. The plunger will continue its movement, opening the valve port by reason of the valve being restrained against further movement, the nuts 39 engaging the hub 33 on the guide. The tool is now rotated to perform its work. Rotation of the tool causes the expander to ride downwardly by reason of the inclined key-ways and keys, the catch key moving inwardly and riding over the surface 42 so as to clear the sleeve. The keys 27 restrain the expander against further rotation, the rotation being limited. The keys take the torsional thrust, relieving the wedge head so that there is no side thrust upon the cutter parts. The wedge head has mortises 43. A lower pin block 44 is pivotally secured by a pin 45 to the cutter end at a slot, there being a tenon on the block riding in the mortise. An upper pin block 46 has a tenon riding in a mortise and journalled between the blocks are rollers 47. The construction is such that the expander head swings the block inwardly and outwardly upon its movement up and down in the body. On moving it downwardly into expanding position, the cutters are moved downwardly into work performing positions.

The subject-matter claimed in this case is subsidiary to that claimed in copending application Ser. No. 244,125, filed on even date herewith; and is companion to that of copending application Ser. No. 244,126, filed on the same date. Insofar as generic claims are made covering the specific subject-matter of this and the last mentioned application, the claims thereto are carried in the first mentioned application. The claimed subject-matter of this application is limited to the diagonal or spiral interconnection between the two relatively longitudinal members (stem and body) which is a feature peculiar to this present application; the second mentioned application is limited in its subject-matter to the specific formation of hydraulic trip mechanism, shown herein and in said second mentioned application, in its differentiations over the corresponding parts of the first mentioned application.

What I claim is:

1. A tool of the character described comprising a hollow body; work performing members projectable and retractable with respect to said body; a longitudinally urgable expander for said work performing members mounted in the bore of said body including a stem, an expander head swivelled to said stem and engaged with said work performing members to project and retract the latter, said body and said stem being provided with inclined co-operating keys and key-ways to cause longitudinal movement of said stem and body and to restrain rotation of said stem in relation to said body upon rotation of said stem; and trip mechanism to restrain said stem and body against longitudinal movement in the urged direction.

2. A rotary tool of the character described comprising a hollow body having slots in the peripheral wall thereof, work performing members projectable and retractable through said slots; a longitudinally urgable expander for said work performing members mounted in the bore of said body and including a stem for rotating said tool, an expander head swivelled to said stem and engaged with said work performing members mounted in the bore of said body and including a stem, an expander head swivelled to said stem and engaged with said work performing members to project and retract the latter, said body and said stem being provided with inclined co-operating keys and key-ways to cause longitudinal movement of said stem and body and to restrain rotation of said stem in relation to said body upon rotation of said stem and to take the torsional strain of rotating said tool.

3. A tool of the character described comprising a hollow body having slots in the peripheral wall thereof, work performing members projectable and retractable through said slots; a longitudinally urgable expander for said work performing members mounted in the bore of said body and including a stem, an expander head swivelled to said stem and engaged with said work performing members to project and retract the latter, said body and said stem being provided with inclined co-operating keys and key-ways to cause longitudinal movement of said stem and body and to restrain rotation of said stem in relation to said body upon rotation of said stem; and a trip mechanism to restrain said stem and body against longitudinal movement in the urged direction.

4. A rotary tool of the character described comprising a hollow body having slots in the peripheral wall thereof, work performing members projectable and retractable through said slots; a longitudinally urgable tubular expander for said work performing members mounted in the bore of said body including a stem for rotating said tool, said stem having a socket, an expander head having a pin disposed in said socket to provide a swivel connection, said head being engaged with said work performing members to project and retract the latter, said body and said stem being provided with inclined cooperating keys and key-ways to cause longitudinal movement of said stem and body and to restrain rotation of said stem in relation to said body upon rotation of said stem and to take the torsional strain of rotating said tool.

5. A tool of the character described comprising a hollow body having slots in the peripheral wall thereof, work performing members projectable and retractable through said stem; a longitudinally urgable tubular expander for said work performing members mounted in the bore of said body including a stem having a socket, an expander head having a pin disposed in said socket to provide a swivel connection, said head being engaged with said work performing members to project and retract the latter, said body and said stem being provided with inclined co-operating keys and key-ways to cause longitudinal movement of said stem and body and to restrain rotation of said stem in relation to said body upon rotation of said stem; and a trip mechanism to restrain said stem and body against longitudinal movement in the urged direction.

6. A rotary tool of the character described comprising a hollow body having slots in the peripheral wall thereof, work performing members projectable and retractable through said slots; a longitudinally urgable tubular expander for said work performing members mounted in the bore of said body including a stem having a socket, an expander head having a wedge end, said work performing members being mortised to the inclined face of said wedge to cause said wedge to expand and contract said members, said expander head having a pin disposed in said socket to provide a swivel connection, said body and said stem being provided with inclined co-operating keys and key-ways to cause longitudinal movement of said stem and body and to restrain rotation of said stem in relation to said body upon rotation of said stem.

7. In an expansive cutting tool, the combination of two relatively movable members interconnected so as to have spiral relative movement, expansive and contractive cutters carried by one member, the other member and the cutters interengaging to cause cutter expansion by reason of such relative movement in one direction, and hydraulically actuated trip mechanism restraining such relative movement.

8. In an expansive cutting tool, the combination of a cutter carrying body and a stem interconnected so as to have with reference to each other a spiral movement along and around a central longitudinal axis, expansive and contractive cutters in the body, and a cutter expanding head swivelled to the stem and engaging the cutters to move them by virtue of relative longitudinal movement of the head.

In witness that I claim the foregoing I have hereunto subscribed my name this 5th day of December, 1927.

ROLAND CRUM.